US011778361B1

(12) United States Patent
Lovitt

(10) Patent No.: US 11,778,361 B1
(45) Date of Patent: Oct. 3, 2023

(54) HEADSET ACTIVATION VALIDATION BASED ON AUDIO DATA

(71) Applicant: Meta Platforms Technologies, LLC, Menlo Park, CA (US)

(72) Inventor: Andrew Lovitt, Redmond, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 67 days.

(21) Appl. No.: 17/184,063

(22) Filed: Feb. 24, 2021

Related U.S. Application Data

(60) Provisional application No. 63/043,626, filed on Jun. 24, 2020.

(51) Int. Cl.
| | |
|---|---|
| *H04R 1/10* | (2006.01) |
| *G10L 15/08* | (2006.01) |
| *G10L 25/90* | (2013.01) |
| *G06F 1/3234* | (2019.01) |
| *G10L 15/28* | (2013.01) |
| *G06F 1/3215* | (2019.01) |
| *G02B 27/01* | (2006.01) |
| *H04W 52/02* | (2009.01) |
| *G10L 25/48* | (2013.01) |
| *G10L 25/21* | (2013.01) |

(52) U.S. Cl.
CPC .......... *H04R 1/1041* (2013.01); *G06F 1/325* (2013.01); *G10L 15/08* (2013.01); *G10L 15/28* (2013.01); *G10L 25/90* (2013.01); *G02B 27/0176* (2013.01); *G06F 1/3215* (2013.01); *G10L 25/21* (2013.01); *G10L 25/48* (2013.01); *G10L 2015/088* (2013.01); *H04W 52/0254* (2013.01)

(58) Field of Classification Search
CPC ..... H04R 1/1041; G06F 1/325; G06F 1/3215; G10L 15/08; G10L 15/28; G10L 25/90; G10L 2015/088; G10L 25/48; G10L 25/21; H04W 52/0254; G02B 27/0176
See application file for complete search history.

(56) References Cited

U.S. PATENT DOCUMENTS

| | | | |
|---|---|---|---|
| 9,047,857 B1* | 6/2015 | Barton | G10L 25/48 |
| 10,134,425 B1* | 11/2018 | Johnson, Jr. | G10L 15/05 |
| 10,289,205 B1* | 5/2019 | Sumter | G06F 3/0346 |
| 2004/0141418 A1* | 7/2004 | Matsuo | H04R 3/005 367/124 |
| 2006/0274911 A1* | 12/2006 | Mao | H04R 3/005 381/334 |
| 2014/0170979 A1* | 6/2014 | Samanta Singhar | G10L 25/60 455/41.2 |
| 2014/0191927 A1* | 7/2014 | Cho | G06F 3/011 345/8 |

(Continued)

*Primary Examiner* — Carolyn R Edwards
*Assistant Examiner* — Kuassi A Ganmavo
(74) *Attorney, Agent, or Firm* — Fenwick & West LLP

(57) ABSTRACT

Validation of an activation event of a device based on analyzing audio data is disclosed. The device detects an activation event, e.g., an input to a soft-touch button or a wake word detected by a microphone array. Responsive to detecting the activation event, the device captures, via a microphone array on the device, sound from a local area of the device. The device stores the captured sound as audio data in an audio buffer. The device performs a validation of the activation event by analyzing the captured sound. The device performs an action based on a result of the validation.

17 Claims, 8 Drawing Sheets

First Configuration
400

(56) References Cited

U.S. PATENT DOCUMENTS

| | | | |
|---|---|---|---|
| 2014/0337030 A1* | 11/2014 | Lee | G10L 15/32 |
| | | | 704/251 |
| 2014/0337036 A1* | 11/2014 | Haiut | G06F 3/167 |
| | | | 704/275 |
| 2014/0348345 A1* | 11/2014 | Furst | G10L 25/78 |
| | | | 381/111 |
| 2015/0302855 A1* | 10/2015 | Kim | G10L 15/22 |
| | | | 704/275 |
| 2015/0340040 A1* | 11/2015 | Mun | G10L 17/22 |
| | | | 704/246 |
| 2016/0077574 A1* | 3/2016 | Bansal | G06F 1/3293 |
| | | | 704/275 |
| 2017/0178628 A1* | 6/2017 | Macours | G10L 15/08 |
| 2018/0018010 A1* | 1/2018 | Liu | G10L 25/87 |
| 2019/0260413 A1 | 8/2019 | Medapalli et al. | |

* cited by examiner

HEADSET ACTIVATION VALIDATION BASED ON AUDIO DATA

CROSS REFERENCE TO RELATED APPLICATIONS

This application claims the benefit of U.S. Provisional Application No. 63/043,626, filed Jun. 24, 2020, which is incorporated by reference in its entirety.

FIELD OF THE INVENTION

This disclosure relates generally to validation of an activation of a device (e.g., a headset), and more specifically to device activation validation based on audio data.

BACKGROUND

Some battery-operated headsets place a power button or switch for powering the headset on and off. There may arise instances where a user may be handling these headsets and unintentionally activates the headsets. These headsets may expend power and computing resources upon such false activations. There is a need for identifying and reducing such false activations.

SUMMARY

A headset validates activation events using captured audio data and performs an action in response to the result of the validation. The headset comprises at least an input device (e.g., a soft-touch button, a mechanical button, a switch, a slider, a dial, etc.) and a microphone array. The headset detects an activation event, e.g., via the input device and/or the microphone array. The microphone array captures sounds in a local area of the headset as audio data. The headset validates the activation event by analyzing the audio data, and, based on the result of the validation, an action is performed.

In some embodiments, a method for activation validation is described. The method comprises detecting an activation event on a device; responsive to detecting the activation event: capturing, via a microphone array on the device, sound from a local area of the device, storing the captured sound as audio data in a buffer, performing a validation of the activation event by analyzing the audio data, and performing an action based on a result of the validation. In one or more embodiments, a non-transitory computer-readable storage medium storing instructions for performing the method is described.

In some embodiments a headset includes a frame, a soft-touch button, a microphone array, and a controller. The frame is configured to be worn on a head of a user. The soft-touch button on the frame and configured to detect an activation event. The microphone array is configured to capture sound. The controller is configured to instruct the microphone array to capture sound from the local area of the headset based in part on the activation event, store the captured sound from the microphone array as audio data in a buffer, perform a validation of the activation event by analyzing the audio data, and perform an action and/or instruct the headset to perform an action based on a result of the validation.

Figure 1:
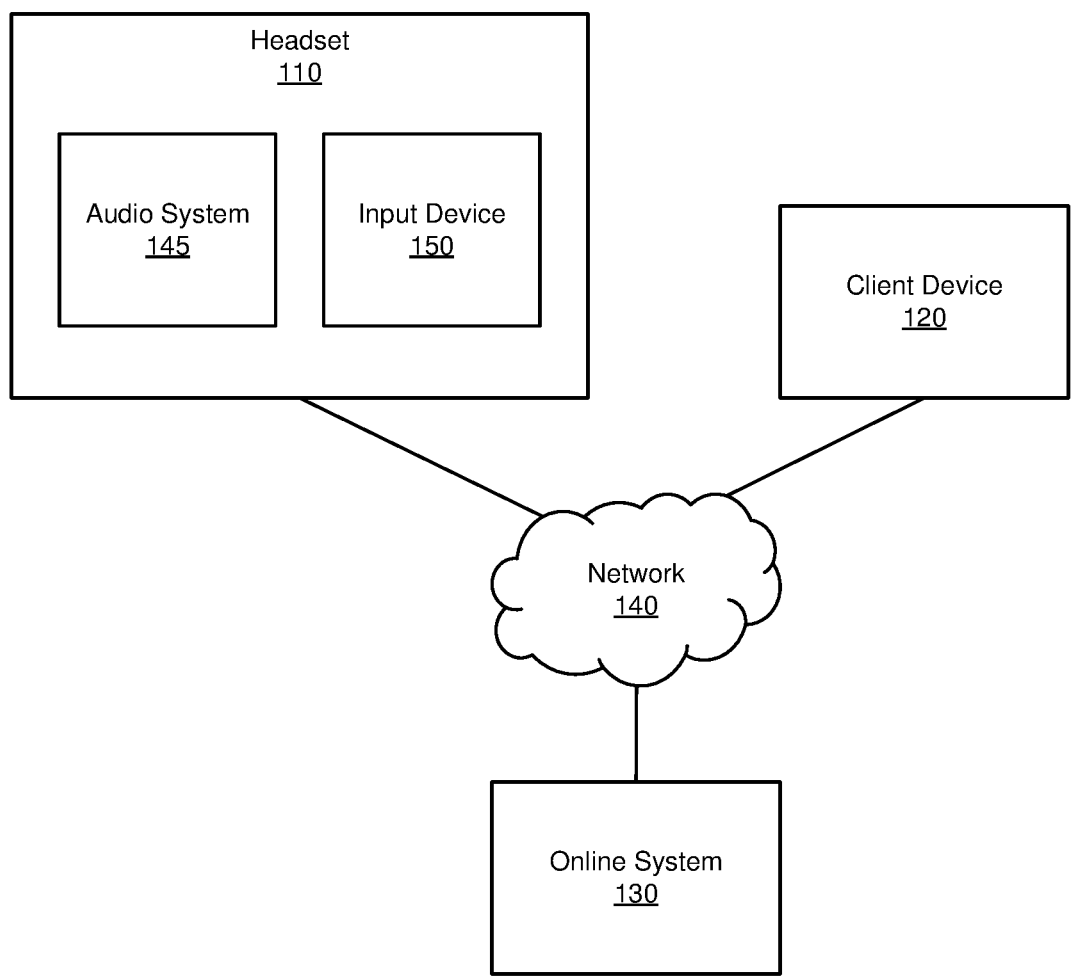
FIG. 1 is a system including a headset that validates activation events based on analyzing audio data, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A headset implements smart activation logic which validates activation events using captured audio data. The headset comprises at least an input device (e.g., a soft-touch button, a mechanical button, a switch, a slider, a dial, etc.) and an audio system, wherein the audio system comprises at least a microphone array. The headset detects an activation event, e.g., via the input device. Responsive to the activation event, the microphone array captures sounds in a local area of the headset as audio data. The audio data may be stored in an audio buffer. The headset validates the activation event by analyzing the audio data stored in the audio buffer. In one embodiment, the validation evaluates whether a proximity of a user is within an interaction range of the headset. The interaction range is a region surrounding the headset (or device) that if the user is within the region it is assumed that the user is attempting to interact with the headset, and if the user is outside of the region it is assumed that the user is not attempting to interact with the headset. In another embodiment, the validation evaluates movement of the user relative to the headset. The headset performs an action based on the result of the validation. For example, responsive to a result of a valid activation state, the headset may transition to an active state, where power is supplied to some or all of the components of the headset. As another example, responsive to the result of the valid activation state, the headset may transmit audio data stored in the audio buffer to an external device. Responsive to a result of an invalid activation state, the headset may, for example, return the headset to a sleep mode—a low-power mode where power is supplied to a minimal set of components and/or minimal power is applied to some or all of the components.

False positive activation events are unintended activation events, wherein the user may not have truly intended to activate the headset. As such, performing actions or switching the headset into an active state in instances of false positive activations may lead to unnecessary consumption of power and resources. Validation of activation events based on analyzing audio data by a headset and/or controller as described herein reduces false positive activation events. Reduction of false positive activation events can lead to recovering the unnecessary use of power and resources.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Headset System Environment

FIG. 1 is a system 100 including a headset 110 that validates activation events based on analyzing audio data, in accordance with one or more embodiments. The first system 100 also includes, in addition to the headset 110, a client device 120 and an online system 130, which are all communicatively coupled via the network 140. Other embodiments of the first system 100 can have any number of headsets 110, any number of client devices 120, any number of online systems 130, or any combination thereof. The functions performed by the various entities of FIG. 1 may also vary in different embodiments.

Figure 2A:
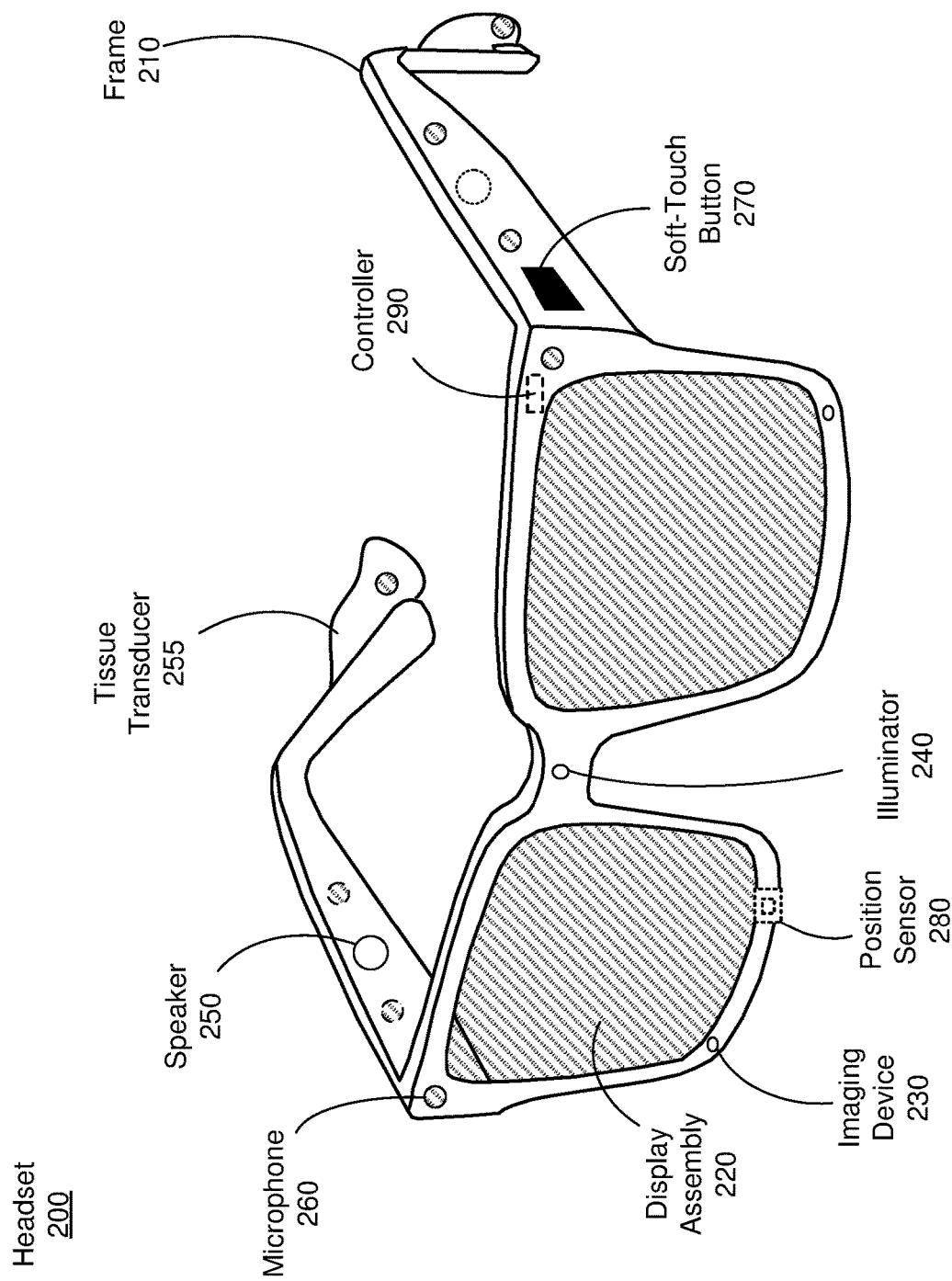
FIG. 2A is a perspective view of a headset implemented as an eyewear device, in accordance with one or more embodiments.
Figure 2B:
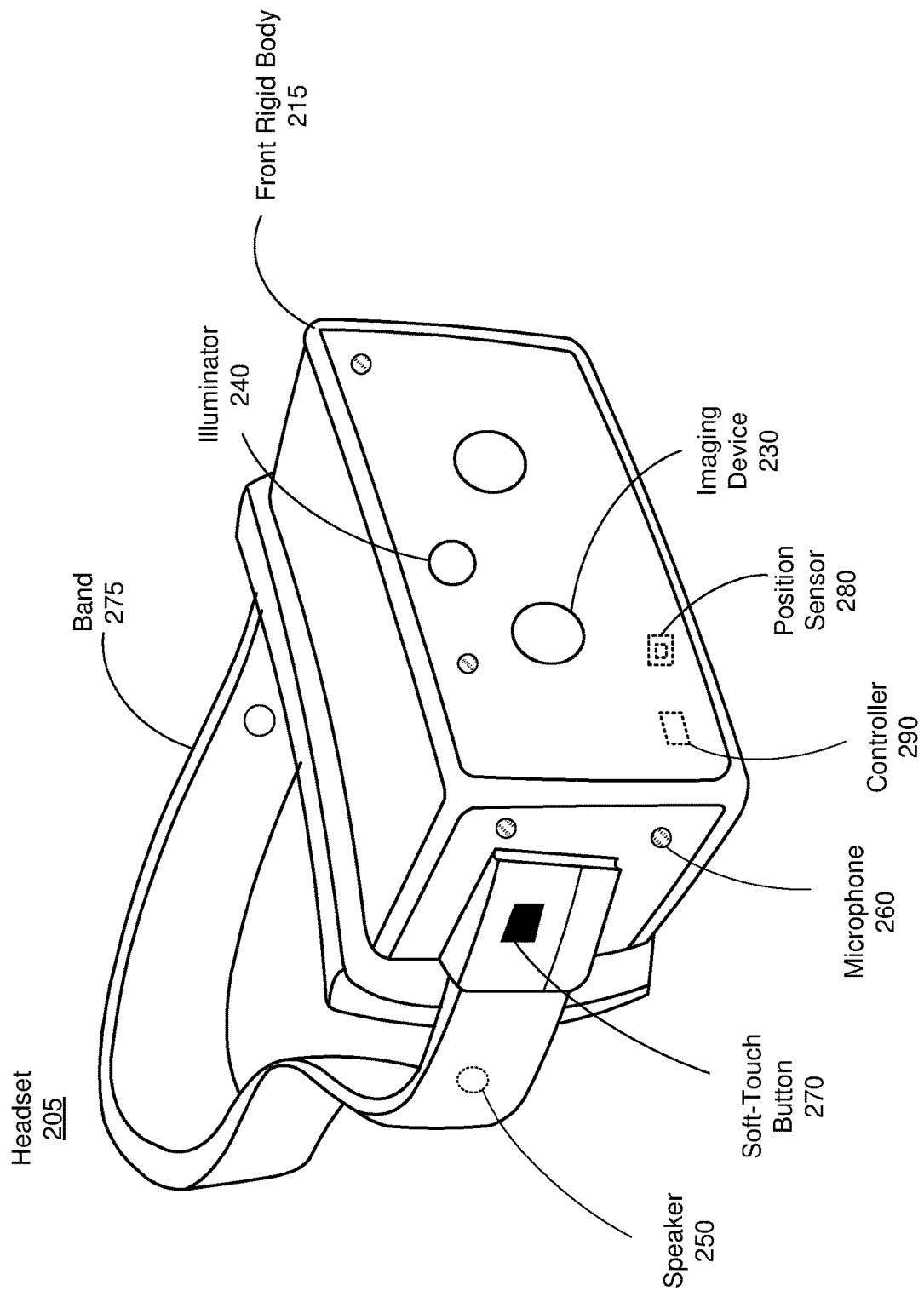
FIG. 2B is a perspective view of a headset implemented as a head-mounted display, in accordance with one or more embodiments.

The headset 110 provides media content to a user of the headset 110. The headset 110 comprises a frame (or some other structure) that is configured to be coupled to the head of the user. The frame holds the various components of the headset 110. Some components of the headset 110 are configured to provide the media content. Examples of media content include, but are not limited to, visual content, audio content, artificial reality content, haptic feedback content, etc. Various components capable of providing media content will be further described in the remaining figures. One example is a display system for providing visual content. Another example is an audio system 145 for providing audio content, etc. The audio system 145 is further be configured to detect acoustic signals (also referred to as capturing sound) in a local area of the headset 110. The audio system 145 may include an audio buffer for storing the captured sound as audio data. The headset 110 further includes one or more input devices 150 that are configured to receive user input. An example of the input device 150 is a soft-touch button capable of detecting user input as a touch of the soft-touch button. Other example input devices 150 include a switch with various states that can be switched to, a slider or a dial with a continuum of states that can be turned to, a mechanical button that can be depressed, etc. In some embodiments, the input device 150 is separate from the headset 110, e.g., on another device or by itself separate from the headset 110. Some example embodiments of the headset 110 are shown in FIGS. 2A and 2B and described in the figure descriptions.

One or more of the user inputs received by the input device 150 trigger an activation event of the headset 110. An activation event is an input that effectually requests that one or more positive actions occur. Examples of positive actions include waking the headset 110, switching the headset from a low-power state to an active state (also referred to as a high-power state) to supply power to one or more of its components, transmitting audio to and/or from another device (e.g., the client device 120 or the online system 130), providing a portion of media content (e.g., beginning to play music), or some other function of the headset 110. The activation event may be detected by the headset 110 from a low-power state. As such, inputs received in an active state would not trigger as activation events. The headset 110 needs to expend power and computing resources to perform the requested one or more positive actions. Unintended activation events (also referred to as false positive activation events) may lead to unnecessary consumption of power and resources. Prior to performing the positive action, the headset 110 validates the activation event by capturing sound in the local area and analyzing the captured sound, resulting in either a valid activation state or an invalid activation state. Based on a result of the validation, the headset 110 performs at least one action. In a valid activation state, the headset 110 proceeds to performing the one or more positive actions requested in the activation event, e.g., wake from a low-power mode, provide some media content, record audio, stream audio content, etc. In an invalid activation state, in some embodiments the headset 110 also performs an action—but it is a return action that returns the headset 110 into a prior state. An example return action involves switching back to a low-power state for reserving power. Another example return action entails performing another iteration of validating the activation event based on analysis of the audio data. In the invalid activation state, the headset 110 refrains from performing the one or more positive actions requested by the activation event. Validation of the activation event is advantageous in decreasing the rate of performing actions in response to false positive activation events, thereby also improving efficient use of power and computing resources.

The client device 120 is a computing device used by the user. The client device 120 may be a personal or mobile computing device, such as smartphones, tablets, or notebook computers. The client device 120 may comprise one or more input devices, e.g., a camera, a microphone, a keyboard, a touchscreen, etc., configured to capture data. The client device 120 is communicatively coupled to the headset 110, e.g., via a wireless or a wired connection. The client device may also store and share media content with the headset 110. The client device 120 can run various applications that provide the media content to the headset 110. In one or more embodiments, the client device 120 may process some or all of the data used by the headset 110. Offloading the processing burden to the client device 120 can aid in freeing up computing resources on the headset 110 and reducing power and/or weight requirements for the headset 110. In some embodiments, the client device 120 may further provide power to the headset 110, e.g., via an electric wire tether. In one embodiment, the client device 120 interacts with the online system 130 through client applications configured to interact with the online system 130.

The online system 130 stores and shares content. The online system 130 may include a database of content which may be provided to the headset 110 for presentation. In one embodiment, the online system 130 is a social networking system. Each user of the social networking system is associated with a user profile, which is stored in a user profile store. A user profile includes declarative information about the user that was explicitly shared by the user and may also include profile information inferred by the online system 130. Examples of information stored in a user profile include biographic, demographic, and other types of descriptive information, such as work experience, educational history, gender, hobbies or preferences, location and the like. A user profile may also store other content provided by the user, for example, image data or audio data (captured by the headset 110 and/or the client device 120). The online system 130 may also have a content store storing various content items, some of which may be presentable by the headset 110. Responsive to a request for a content item, the online system 130 can provide the requested content item to the headset 110 and/or the client device 120.

Interactions between the headset 110, the client device 120, and/or the online system 130 include sharing data (including media content), requests, provision of instructions for performing actions, or any combination thereof. For example, the headset 110 detects an activation event and validates the activation event. Responsive to a valid activation state, the headset 110 may transmit a request for audio content to the client device 120. The client device 120 streams the requested audio content to the headset 110, and the headset 110 provides the audio content to the user via the audio system 145. In another embodiment, the headset 110 may transmit audio data to the client device 120 and/or the online system 130 responsive to a valid activation state. In some embodiments, the headset 110 may record speech from the user for use in performing various operations. The headset provides a request including the captured audio data to the client device 120 and/or the online system 130. The client device 120 and/or the online system 130 may analyze the audio data. For example, a speech recognition algorithm may be implemented in conjunction with one or more machine learning models, to determine what is requested by a user speaking. In another example, analyzing the audio involves monitoring an acoustic receptive field of the microphone array. Various audio analyses are further described below in conjunction with FIG. 3. The analysis may determine a request to perform a function (change a profile status in the online system 130), a request for some media content (play folk music), etc. Transmission of data (particularly audio content and/or other media content) to and/or from the headset 110 consumes significant power and computing resources. Thus, validation of activation events saves power and resources by reducing instances of data transmission due to false positive activation events.

The network 140 connects the headset 110, the client device 120, and the online system 130. In one embodiment, the network 140 uses standard communications technologies and/or protocols. For example, the network 140 includes communication links using one or more technologies such as Ethernet, 802.11 (Wi-Fi), Bluetooth, Near Field Communication (NFC), Radio Frequency Identification (RFID), worldwide interoperability for microwave access (WiMAX), cellular network technologies, 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

Example Headsets

FIG. 2A is a perspective view of a headset 200 implemented as an eyewear device, in accordance with one or more embodiments. The headset 200 is an embodiment of the headset 110. In some embodiments, the eyewear device is a near eye display (NED). In general, the headset 200 may be worn on the face of a user such that content (e.g., media content) is presented using a display assembly and/or an audio system. However, the headset 200 may also be used such that media content is presented to a user in a different manner. The headset 200 includes a frame 210, and may include, among other components, a display assembly 220, an imaging device 230, an illuminator 240, one or more speakers 250, one or more tissue transducers 255, one or more microphones 260, a soft-touch button 270, a position sensor 280, and a controller 290. The speakers 250, the tissue transducers 255, and the microphones 260 may be grouped as an audio system of the headset 200. While FIG. 2A illustrates the components of the headset 200 in example locations on the headset 200, the components may be located elsewhere on the headset 200, on a peripheral device paired with the headset 200, or some combination thereof. Similarly, there may be more or fewer components on the headset 200 than what is shown in FIG. 2A.

The frame 210 holds the other components of the headset 200. The frame 210 includes a front part that holds the one or more display elements of the display assembly 220 and end pieces (e.g., temples) to attach to a head of the user. The front part of the frame 210 bridges the top of a nose of the user. The length of the end pieces may be adjustable (e.g., adjustable temple length) to fit different users. The end pieces may also include a portion that curls behind the ear of the user (e.g., temple tip, ear piece).

The display assembly 220 provides light to a user wearing the headset 200. As illustrated the headset includes a display element for each eye of a user. In some embodiments, the display assembly 220 generates image light that is provided to an eyebox of the headset 200. The eyebox is a location in space that an eye of user occupies while wearing the headset 200. For example, the display assembly may be implemented as a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 200. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, the display elements are opaque and do not transmit light from a local area around the headset 200. The local area is the area surrounding the headset 200. For example, the local area may be a room that a user wearing the headset 200 is inside, or the user wearing the headset 200 may be outside and the local area is an outside area. In this context, the headset 200 generates VR content. Alternatively, in some embodiments, one or both of the display elements are at least partially transparent, such that light from the local area may be combined with light from the one or more display elements to produce AR and/or MR content.

In some embodiments, a display element of the display assembly 220 does not generate image light, and instead is a lens that transmits light from the local area to the eyebox. For example, one or both of the display elements may be a lens without correction (non-prescription) or a prescription lens (e.g., single vision, bifocal and trifocal, or progressive) to help correct for defects in a user's eyesight. In some embodiments, the display element may be polarized and/or tinted to protect the user's eyes from the sun.

In some embodiments, the display assembly 220 may include an additional optics block (not shown). The optics block may include one or more optical elements (e.g., lens, Fresnel lens, etc.) that direct light from the display elements to the eyebox. The optics block may, e.g., correct for aberrations in some or all of the image content, magnify some or all of the image, or some combination thereof.

The imaging device 230 captures image data. The imaging device 230 may be a camera with a camera sensor and one or more optical elements. The imaging device 230 may capture image data in a field of view of the imaging device 230. The image data may comprise images, video, or a combination thereof. The headset 200 may include a storage medium for storage of the captured image data.

The illuminator 240 illuminates a portion of the local area with light. The light may be, e.g., structured light (e.g., dot pattern, bars, etc.) in the infrared (IR), IR flash for time-of-flight, etc. The illuminated local area may be captured by the image device 230.

In some embodiments, the headset 200 comprises a depth controller assembly (DCA) for determining depth information for a portion of a local area surrounding the headset 200. The DCA may include one or more imaging devices 230 and a DCA controller (not shown in FIG. 2A), and may also include the illuminator 240. In some embodiments, the one or more imaging devices 230 capture images of the portion of the local area that include the light from the illuminator 240. The DCA controller (not shown) computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 240), some other technique to determine depth of a scene, or some combination thereof. In another embodiment, the DCA controller (not shown) may be part of the controller 290.

The audio system provides and/or captures audio content. The audio system includes a transducer array, a microphone array, and an audio controller (not shown). However, in other embodiments, the audio system may include different and/or additional components. Similarly, in some cases, functionality described with reference to the components of the audio system can be distributed among the components in a different manner than is described here. For example, some or all of the functions of the controller may be performed by a remote server or another device. As another example, the audio controller (not shown) may be part of the controller 290.

The transducer array presents sound to user. The transducer array includes a plurality of transducers. A transducer may be a speaker 250 or a tissue transducer 255 (e.g., a bone conduction transducer or a cartilage conduction transducer). Although the speakers 250 are shown exterior to the frame 210, the speakers 250 may be enclosed in the frame 210. In some embodiments, instead of individual speakers for each ear, the headset 200 includes a speaker array comprising multiple speakers integrated into the frame 210 to improve directionality of presented audio content. The tissue transducer 255 couples to the head of the user and directly vibrates tissue (e.g., bone or cartilage) of the user to generate sound. The number and/or locations of transducers may be different from what is shown in FIG. 2A.

The microphone array detects sounds within the local area of the headset 200. The local area may refer to space in and around the headset 200. The microphone array includes a plurality of microphones 260. A microphone 260 captures sounds emitted from one or more sound sources in the local area (e.g., a room). The microphone 260 is configured to detect sound and convert the detected sound into an electronic format (analog or digital). The microphones 260 may alternatively be acoustic wave sensors, sound transducers, or similar sensors that are suitable for detecting sounds.

In some embodiments, one or more microphones 260 may be placed in an ear canal of each ear (e.g., acting as binaural microphones). In some embodiments, the microphones 260 may be placed on an exterior surface of the headset 200, placed on an interior surface of the headset 200, separate from the headset 200 (e.g., part of some other device), or some combination thereof. The number and/or locations of microphones 260 may be different from what is shown in FIG. 2A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 200.

The audio controller controls operation of the audio system. The audio controller processes information from the microphone array that describes sounds detected by the microphone array. The audio controller may comprise a processor and a computer-readable storage medium. The audio controller may be configured to validate activation events by analyzing audio data, generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 250, or some combination thereof. In some embodiments, the audio controller is a component of or an embodiment of the controller 290. In other embodiments, some or all of the operations of the audio controller are performed by the controller 290.

The soft-touch button 270 detects user input in the form of a touch. The soft-touch button 270 is an embodiment of the input device 150. A touch is detected with a contact of an external object (e.g., skin of the user) to a contact surface of the soft-touch button 270. In some embodiments, a threshold amount of pressure needs to be applied to the soft-touch button to register the touch. In one or more embodiments, the soft-touch button 270 is a capacitive touch sensor that detects a distance of the external object from the contact surface. Although the headset 200 illustrates one soft-touch button 270 located on an exterior surface of the frame 210 left end piece, the headset 200 may comprise any number of soft-touch buttons 270 located in any of a variety of positions on the headset 200. In other embodiments, other types of input devices 150 may be integrated in substitution of or in addition to the soft-touch button 270. For example, a mechanical button is implemented, wherein a threshold depression of the mechanical button registers as a touch.

The position sensor 280 generates one or more measurement signals in response to motion of the headset 200. The position sensor 280 may be located on a portion of the frame 210 of the headset 200. The position sensor 280 may include an inertial measurement unit (IMU) that measures IMU data describing acceleration (translational and/or rotational), orientation, or some combination thereof. Examples of position sensor 280 include: one or more accelerometers, one or more gyroscopes, one or more magnetometers, another suitable type of sensor that detects motion, a type of sensor used for error correction of the IMU, or some combination thereof. The position sensor 280 may be located external to the IMU, internal to the IMU, or some combination thereof.

In some embodiments, the headset 200 may provide for simultaneous localization and mapping (SLAM) for a position of the headset 200 and updating of a model of the local area. For example, the headset 200 may include a passive camera assembly (PCA) that captures color image data from the imaging device 230. In some embodiments, some or all of the imaging devices 230 may also function as part of the PCA. The images captured by the PCA and the depth information determined by the DCA may be used to determine parameters of the local area, generate a model of the local area, update a model of the local area, or some combination thereof. Furthermore, the position sensor 280 tracks the position (e.g., location and pose) of the headset 200 within the room. Additional details regarding the components of the headset 200 are discussed below in connection with FIG. 6.

The controller 290 controls the components of the headset 200. The controller is communicatively coupled to the display assembly 220, the imaging device 230, the illuminator 240, the audio system, the soft-touch button 270, and the position sensor 280. In embodiments with the DCA and/or the PCA, the controller 290 is also in communication with the DCA and/or the PCA.

The controller 290 detects an activation event of the headset 200. An activation event may be identified based on either a touch detected by the soft-touch button 270 or audio captured by one or more microphones 260 of the audio system. The controller 290 validates the activation event by analyzing audio captured by the microphones 260, yielding either a valid activation state or an invalid activation state. Responsive to the result of the validation, the controller 290 performs an action. A positive action is performed in response to a valid activation state. Positive actions may include waking the headset 200 from a low-power state (or mode), providing media content (e.g., audio content via the transducer array of the audio system or visual content via the display assembly 220), capturing data (e.g., recording audio via the microphones 260, capturing image data via the imaging device 230), sharing data with another device (e.g., the client device 120 and/or the online system 130), another function of the headset 200, etc. A return action is performed in response to an invalid activation state. Responsive to the invalid activation state, the controller 290 refrains from performing any positive action. In one embodiment, responsive to the activation event, the controller 290 supplies power to the microphones 260 for recording audio data. Subsequently, the controller 290 performs a return action which stops supplying power to the microphones 260 responsive to determining an invalid activation state. Another example return action involves performing another iteration of validating the activation event.

FIG. 2B is a perspective view of a headset 205 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 215 and a band 275. The headset 205 includes many of the same components described above with reference to FIG. 2A, but modified to integrate with the HMD form factor. For example, the HMD includes a display assembly, a DCA, an audio system, and a position sensor 280. FIG. 2B shows the illuminator 240, a plurality of the speakers 250, a plurality of the imaging devices 230, a plurality of microphones 260, a soft-touch button 270, and the position sensor 280. The speakers 250 may be located in various locations, such as coupled to the band 275 (as shown), coupled to front rigid body 215, or may be configured to be inserted within the ear canal of a user. The HMD may also validate activation events based on analysis of audio data as described above in FIG. 2A.

Audio System

Figure 3:
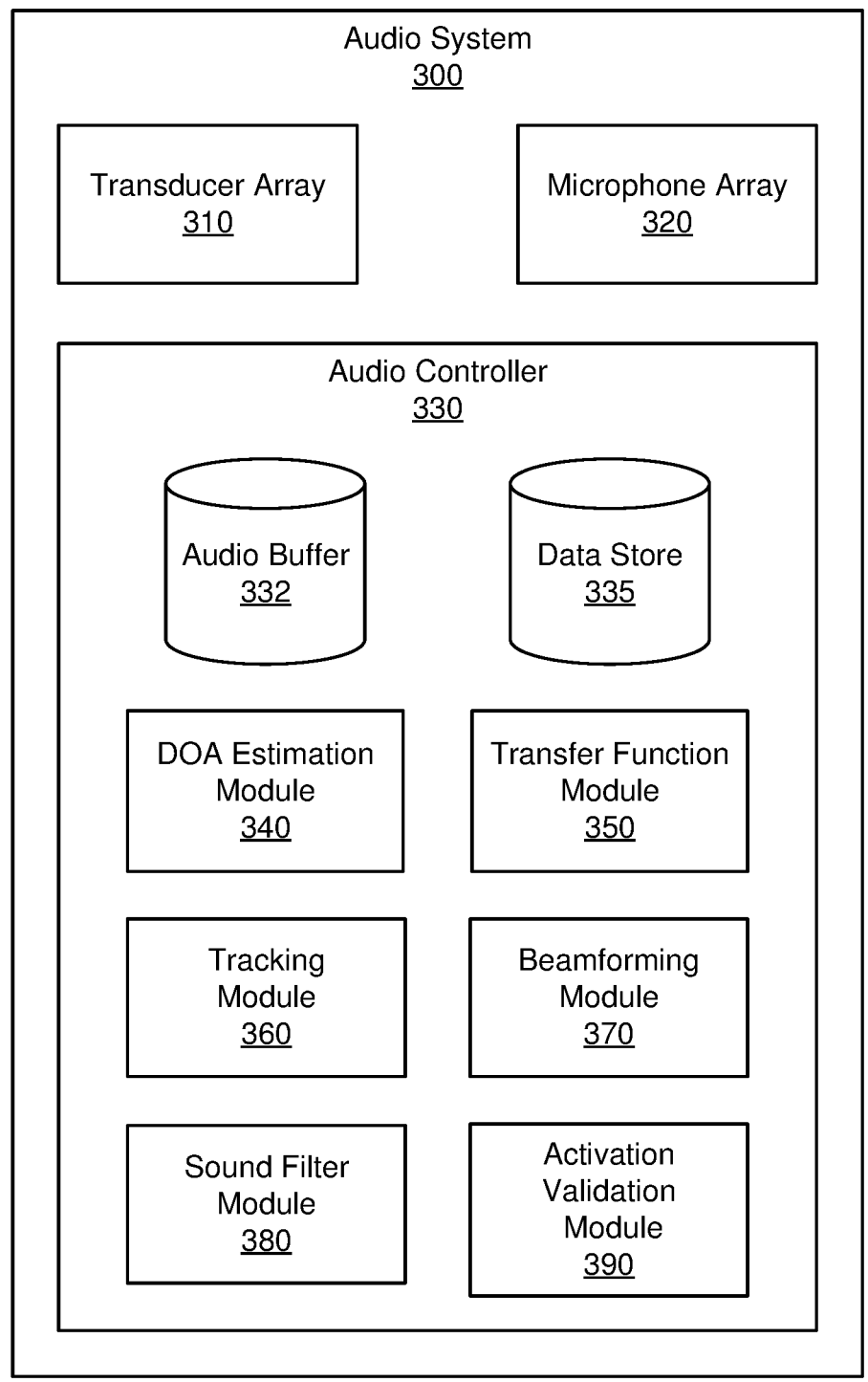
FIG. 3 is a block diagram of an audio system, in accordance with one or more embodiments.

FIG. 3 is a block diagram of an audio system 300, in accordance with one or more embodiments. The audio system in FIG. 2A or FIG. 2B may be an embodiment of the audio system 300. The audio system 300 generates audio content for the user. Additionally, the audio system 300 validates activation events based on an analysis of audio data captured by the audio system 300 from a local area of the audio system 300. In the embodiment of FIG. 3, the audio system 300 includes a transducer array 310, a microphone array 320, and an audio controller 330. Some embodiments of the audio system 300 have different components than those described here. Similarly, in some cases, functions can be distributed among the components in a different manner than is described here.

The transducer array 310 is configured to present audio content. The transducer array 310 includes a plurality of transducers. A transducer is a device that provides audio content. A transducer may be, e.g., a speaker (e.g., the speaker 250), a tissue transducer (e.g., the tissue transducer 255), some other device that provides audio content, or some combination thereof. A tissue transducer may be configured to function as a bone conduction transducer or a cartilage conduction transducer. The transducer array 310 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 310 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 330, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 310 generates audio content in accordance with instructions from the audio controller 330. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 300. The transducer array 310 may be coupled to a wearable device (e.g., the headset 200 or the headset 205). In alternate embodiments, the transducer array 310 may be a plurality of speakers that are separate from the wearable device (e.g., coupled to an external console).

The microphone array 320 detects sounds within a local area surrounding the microphone array 320. The microphone array 320 may include a plurality of microphones that each detect air pressure variations of a sound wave and convert the detected sounds into an electronic format (analog or digital). The plurality of microphones may be positioned on a headset (e.g., headset 200 and/or the headset 205), on a user (e.g., in an ear canal of the user), on a neckband, or some combination thereof. In one or more embodiments, one or more outward-facing microphones may be placed on an exterior surface facing away from the headset to capture sounds around the headset. In some embodiments, one or more inward-facing microphones may be placed on an interior surface facing toward the user to monitor an acoustic receptive field in a spatial volume within the headset. These inward-facing microphones may be used to monitor the acoustic receptive field. A microphone may be, e.g., a microphone, a vibration sensor, an accelerometer, or any combination thereof. In some embodiments, the microphone array 320 is configured to monitor the audio content generated by the transducer array 310 using at least some of the plurality of microphones. Increasing the number of sensors may improve the accuracy of information (e.g., directionality) describing a sound field produced by the transducer array 310 and/or sound from the local area.

The audio controller 330 controls operation of the audio system 300. In the embodiment of FIG. 3, the audio controller 330 includes an audio buffer 332, a data store 335, a DOA estimation module 340, a transfer function module 350, a tracking module 360, a beamforming module 370, a sound filter module 380, and an activation validation module 390. The audio controller 330 may be located inside a headset, in some embodiments. Some embodiments of the audio controller 330 have different components than those described here. Similarly, functions can be distributed among the components in different manners than described here. For example, some functions of the controller may be performed external to the headset. The user may opt in to allow the audio controller 330 to transmit data captured by the headset to systems external to the headset, and the user may select privacy settings controlling access to any such data.

The audio buffer 332 stores captured audio data over a past recent time interval. The audio buffer 332 is configured to store captured audio data in an amount up to the past recent time interval, e.g., up to the 5 most recent seconds. If new audio data is captured to past 5 seconds, the audio buffer 332 overwrites with the most time interval. For example, the audio buffer 332 can store audio data up to the past 5 seconds, such that, after 5 seconds, the audio buffer 332 begins to overwrite with the most recent 5 seconds. The time interval may be set anywhere from some number of seconds to some number of minutes. For example, the audio buffer 332 stores captured audio over the most recent 10 seconds that have elapsed. The audio buffer 332 allows for continued access to captured audio data from the past recent time interval while avoiding unnecessary storage of audio data beyond the past recent time interval. In instances with false positive activation events, the audio buffer 332 avoids storing audio data not intended for use, e.g., unintended speech, other background noise, etc. In some embodiments, the audio data is pre-processed prior to storage in the audio buffer 332. Pre-processing may include any processing of the audio data. Examples include compiling sounds captured by each microphone of the microphone array 320, equalizing signals between the microphones, etc.

The data store 335 stores data for use by the audio system 300. Data in the data store 335 (e.g., of relevance for activation validation) may include sounds recorded in the local area of the audio system 300, wake words, audio data stored in the audio buffer 332, acoustic receptive fields, activation states of the headset, sound source locations, virtual model of local area, voice recognition models, speech recognition models, other machine-learned models for use in activation validation, actions (e.g., various positive actions and/or return actions), etc. Other data that may be stored include audio content, head-related transfer functions (HRTFs), transfer functions for one or more sensors, array transfer functions (ATFs) for one or more of the microphones, direction of arrival estimates, sound filters, and other data relevant for use by the audio system 300, or any combination thereof.

The user may opt-in to allow the data store 335 to record data captured by the audio system 300. In some embodiments, the audio system 300 may employ always on recording, in which the audio system 300 records some or all sounds captured by the audio system 300 in order to improve the experience for the user. The user may opt in or opt out to allow or prevent the audio system 300 from recording, storing, or transmitting the recorded data to other entities. In some embodiments, the data store 335 includes the audio buffer 332 that stores captured audio over the most recent time period.

The DOA estimation module 340 is configured to localize sound sources in the local area based in part on information from the microphone array 320. Localization is a process of determining where sound sources are located relative to the user of the audio system 300. The DOA estimation module 340 performs a DOA analysis to localize one or more sound sources within the local area. The DOA analysis may include analyzing the intensity, spectra, and/or arrival time of each sound at the microphone array 320 to determine the direction from which the sounds originated. In some cases, the DOA analysis may include any suitable algorithm for analyzing a surrounding acoustic environment in which the audio system 300 is located. The DOA estimation module 340 may also localize a user within the local area based on the voice of the user, e.g., for use in determining position and/or movement for activation validation.

For example, the DOA analysis may be designed to receive input signals from the microphone array 320 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the microphone array 320 received the direct-path audio signal. The determined angle may then be used to identify the DOA for the received input signal. Other algorithms not listed above may also be used alone or in combination with the above algorithms to determine DOA.

In some embodiments, the DOA estimation module 340 may also determine the DOA with respect to an absolute position of the audio system 300 within the local area. The position of the microphone array 320 may be received from an external system (e.g., some other component of a headset, an artificial reality console, a mapping server, a position sensor (e.g., the position sensor 280), etc.). The external system may create a virtual model of the local area, in which the local area and the position of the audio system 300 are mapped. The received position information may include a location and/or an orientation of some or all of the audio system 300 (e.g., of the microphone array 320). The DOA estimation module 340 may update the estimated DOA based on the received position information.

The transfer function module 350 is configured to generate one or more acoustic transfer functions. Generally, a transfer function is a mathematical function giving a corresponding output value for each possible input value. Based on parameters of the detected sounds, the transfer function module 350 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the microphones in the microphone array 320. Accordingly, for a sound source there is a corresponding transfer function for each of the microphones in the microphone array 320. And collectively the set of transfer functions is referred to as an ATF. Accordingly, for each sound source there is a corresponding ATF. Note that the sound source may be, e.g., someone or something generating sound in the local area, the user, or one or more transducers of the transducer array 310. The ATF for a particular sound source location relative to the microphone array 320 may differ from user to user due to a person's anatomy (e.g., ear shape, shoulders, etc.) that affects the sound as it travels to the person's ears. Accordingly, the ATFs of the microphone array 320 are personalized for each user of the audio system 300.

In some embodiments, the transfer function module 350 determines one or more HRTFs for a user of the audio system 300. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 350 may determine HRTFs for the user using a calibration process. In some embodiments, the transfer function module 350 may provide information about the user to a remote system. The user may adjust privacy settings to allow or prevent the transfer function module 350 from providing the information about the user to any remote systems. The remote system determines a set of HRTFs that are customized to the user using, e.g., machine learning, and provides the customized set of HRTFs to the audio system 300.

The tracking module 360 is configured to track locations of one or more sound sources. The tracking module 360 may compare current DOA estimates and compare them with a stored history of previous DOA estimates. In some embodiments, the audio system 300 may recalculate DOA estimates on a periodic schedule, such as once per second, or once per millisecond. The tracking module may compare the current DOA estimates with previous DOA estimates, and in response to a change in a DOA estimate for a sound source, the tracking module 360 may determine that the sound source moved. In some embodiments, the tracking module 360 may detect a change in location based on visual information received from the headset or some other external source. The tracking module 360 may track the movement of one or more sound sources over time. The tracking module 360 may store values for a number of sound sources and a location of each sound source at each point in time. In response to a change in a value of the number or locations of the sound sources, the tracking module 360 may determine that a sound source moved. The tracking module 360 may calculate an estimate of the localization variance. The localization variance may be used as a confidence level for each determination of a change in movement. In one or more embodiments, the tracking module 360 may track a user based on the captured audio data (or another object) based on a voice of the user for activation validation.

The beamforming module 370 is configured to process one or more ATFs to selectively emphasize sounds from sound sources within a certain area while de-emphasizing sounds from other areas. In analyzing sounds detected by the microphone array 320, the beamforming module 370 may combine information from different microphones to emphasize sound associated from a particular region of the local area while deemphasizing sound that is from outside of the region. The beamforming module 370 may isolate an audio signal associated with sound from a particular sound source from other sound sources in the local area based on, e.g., different DOA estimates from the DOA estimation module 340 and the tracking module 360. The beamforming module 370 may thus selectively analyze discrete sound sources in the local area. In some embodiments, the beamforming module 370 may enhance a signal from a sound source. For example, the beamforming module 370 may apply sound filters which eliminate signals above, below, or between certain frequencies. Signal enhancement acts to enhance sounds associated with a given identified sound source relative to other sounds detected by the microphone array 320.

The sound filter module 380 determines sound filters for the transducer array 310. In some embodiments, the sound filters cause the audio content to be spatialized, such that the audio content appears to originate from a target region. The sound filter module 380 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 380 calculates one or more of the acoustic parameters. In some embodiments, the sound filter module 380 requests the acoustic parameters from a mapping server (e.g., as described below with regard to FIG. 6).

The sound filter module 380 provides the sound filters to the transducer array 310. In some embodiments, the sound filters may cause positive or negative amplification of sounds as a function of frequency.

The activation validation module 390 validates detected activation events. Activation events may be detected by an input via an input device 150, audio data via the microphone array 320, movement detected by a position sensor, movement detected by an imaging device (e.g., as part of a DCA and/or a PCA), any other data detected by another component, or any combination thereof. Examples of input via an input device 150 include a touch of a soft-touch button, a depression of a mechanical button, a movement of a slider. The audio data may in the form of a wake word, which is a specific word or phrase used to activate the device. Upon detecting a wake word from the audio buffer 332, e.g., via speech recognition model, an activation event may be triggered. The speech recognition model is a trained model, e.g., machine-learned, configured to detect speech from audio data. In some embodiments, the speech recognition model may be calibrated for a user's voice. The activation validation module 390 analyzes the captured audio stored in the audio buffer 332 to validate the activation events. Successful validation results in a valid activation state, and a failed validation results in an invalid activation state.

The activation validation module 390 may determine whether the user is within an interaction range of the audio system 300 based on the audio data for validation of activation events. In one embodiment, proximity of the user to the audio system 300 may be determined based on an intensity of a voice of the user. The voice of the user may include speech and other mouth sounds, e.g., laughter, sighs, burps, humming, etc. An intensity threshold is used to determine whether the user is within the interaction range of the audio system 300. The activation validation module 390 may identify the portion of the captured audio relating to the voice of the user and compare the intensity of the voice of the user to the intensity threshold. The activation validation module 390 may identify the voice of the user using a machine-learned model. If the vocal intensity is at or above the intensity threshold, then the user is determined to be within the interaction range of the audio system 300. Conversely, if the vocal intensity is below the intensity threshold, then the user is determined to be outside of the interaction range of the audio system 300. In one example, the vocal intensity is an average of vocal intensity over a sliding window (e.g., 2 second moving average) which is compared against the intensity threshold. In another example, the vocal intensity is a peak intensity over the sliding window (e.g., peak intensity of the user's speech in the 2 second sliding window) which is compared against the intensity threshold.

In some embodiments, the activation validation module 390 evaluates movement of the user relative to the audio system 300 based on the audio data for validation of activation events. In one embodiment, the activation validation module 390 analyzes an intensity of the voice of the user over time to determine the movement of the device to the user. If the vocal intensity increases over time, the activation validation module 390 may determine movement of the user toward the audio system 300. If the user is determined to be moving toward from the audio system 300, then the activation validation module 390 determines that the validation is successful, yielding a valid activation state. Otherwise, the activation validation module 390 determines the validation as a failure, yielding an invalid activation state. In some embodiments, the activation validation module 390 may also use information from one or more IMUs to determine movement of the user's head, alone or in conjunction with the audio data.

In some embodiments, the activation validation module 390 analyzes an acoustic receptive field of the microphone array 320 for validation of activation events. An acoustic receptive field of the microphone array 320 is a spatial map describing acoustic sensitivity of the microphone array 320 and is formed by a combination of individual acoustic receptive fields for each microphone in the microphone array 320. An acoustic receptive field for a microphone is a directional map of one or more directions of one or more sound sources that are detected by the microphone that may depend on presence of one or more external objects in proximity to the microphone. The directional maps of the microphones are combined according to the relative position of each microphone in the microphone array 320. Within the spatial map of the acoustic receptive field of the microphone array, regions that have less than a threshold acoustic sensitivity are considered null regions; whereas regions that meet the threshold acoustic sensitivity are considered active regions The activation validation module 390 may yield a valid activation state if a region of the acoustic receptive field for the audio system 300 is a null region. As an example, it may be determined that the device is being worn by the user if there is a null region for an inward-facing microphone—yielding a valid activation state. The activation module 390 may also determine movement of one or more objects relative to the microphones by evaluating changes in the acoustic receptive fields of the microphones. Continuing the example above, the activation validation module 390 may determine movement of that part of the user's head upon detection of a change in the first region of the acoustic receptive field transitioning between a null region and an active region (at least some threshold of acoustic sensitivity).

In other embodiments, other modules of the audio system 300 may determine a proximity of the user to the audio system 300 and/or a movement of the user relative to the audio system 300 for validation of activation events. For example, the DOA estimation module 340 and/or the tracking module 360 may be used to determine a proximity of the user and/or the movement of the user relative to the audio system 300. The DOA estimation module 340 and/or the tracking module 360 may identify the voice of the user, e.g., via a voice recognition model.

In one or more embodiments, the audio system 300 validates the activation events based on audio data and in part on other data detected by other components of a device which comprises the audio system 300. These other components may include the input device 150, any of the components of a headset (e.g., headsets 110, 200, and 205), or any combination thereof. For example, the audio data may determine whether movement data of a position sensor 280 confirms movement of the user relative to the audio system 300 as determined based on the audio data. In another example, input from the input device 150 confirms proximity of a user to the audio system 300 as determined based on the audio data.

In one or more embodiments, the activation validation module 390 implements one or more machine learning algorithms for validation of activation events. As part of generating a machine learning model, the activation validation module 390 forms a training set of activation events with captured audio labeled as either a valid activation state or an invalid activation state. The activation validation module 390 may extract features into a feature vector from the captured audio of the training set. In one embodiment, the activation validation module 390 applies dimensionality reduction (e.g., via linear discriminant analysis (LDA), principle component analysis, filter bank, Mel-frequency cepstral coefficients (MFCCs), or the like) to reduce the dimensionality of the feature vectors to consolidate the features to be more informative in training the machine learning model. The activation validation module 390 may use supervised machine learning to train the machine learning model, with the feature vectors of the training set. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. When applied to the feature vector extracted from captured audio corresponding to an activation event, the machine learning model outputs a result of the validation between a valid activation state and an invalid activation state. In other embodiments, the machine learning model may further use other data captured by any other sensors (e.g., an imaging device 230 or a position sensor 280 from the headsets 200 and 205) in validation of activation events.

In one or more embodiments, the activation validation module 390 uses a plurality of the approaches described above in conjunction for validation of activation events. In one embodiment, some minimum number of approaches need to be met in order for determination of a valid activation state. For example, at least one of the approaches need to be satisfied, e.g., either the user is determined to be within the interaction range of the audio system 300 or the user is determined to be moving toward the audio system 300. In another embodiment, the activation validation module 390 tallies results from the approaches to determine whether the consensus is a valid activation state or an invalid activation state.

As a result of the activation validation, an action is performed. Actions may be performed by the device implementing the audio system 300, e.g., the headsets 200 and 205, or another device communicatively coupled to the device implementing the audio system 300. According to the result of the validation, a return action or one or more positive actions occur. In a valid activation state, one or more positive actions requested in the activation event may be performed by a device, e.g., wake the device from a low-power mode, provide some media content, record audio, stream audio content, etc. In an invalid activation state, a return action is performed by the device that returns the device into a prior state. An example return action involves switching back to a low-power state for reserving power. Another example return action entails performing another iteration of validating the activation event based on analysis of the audio data. In the invalid activation state, the device also refrains from performing the one or more positive actions requested by the activation event. Validation of the activation event is advantageous in decreasing the rate of performing actions in response to false positive activation events, thereby also improving efficient use of power and computing resources.

Activation Event Validation

Figure 4A:
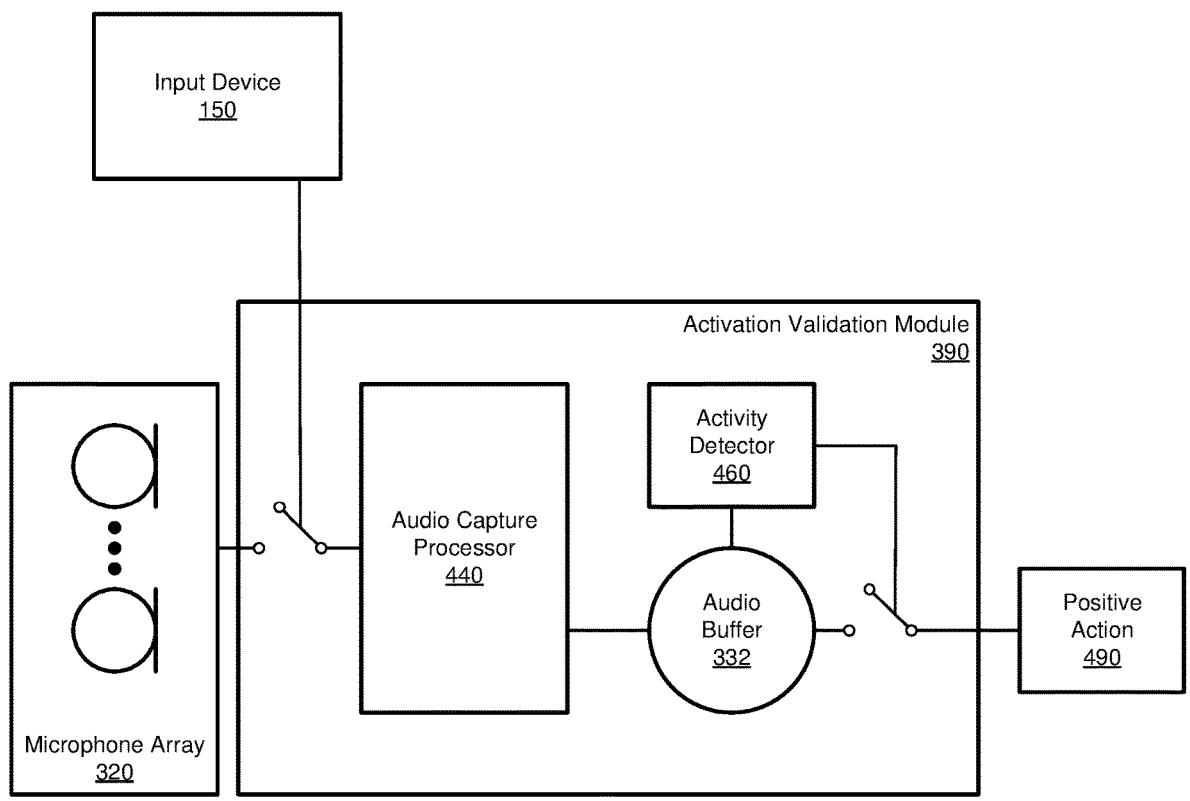
FIG. 4A is a first configuration of the activation validation module, in accordance with one or more embodiments.

FIG. 4A is a first configuration 400 of the activation validation module 390, in accordance with one or more embodiments. The first configuration 400 is an embodiment wherein the audio system 300 that may be implemented with a headset (e.g., the headset 100, the headset 200, or the headset 205). Other embodiments include implementation of the audio system 300 other devices, for example, a console, or a remote control. The headset of this embodiment comprises at least input device 150 and the audio system 300.

The headset detects an activation event with the input device 150. As noted above, the activation event may be determined according to a touch input received by the input device 150. The input device 150 may be an embodiment of the soft-touch button 270. Responsive to the activation event as detected by the input device 150, a switch is closed between the microphone array 320 and an audio capture processor 440, wherein the microphone array 320 captures sound of the local area which is provided to the audio capture processor 440. In one embodiment, the switch located between the microphone array 320 and the audio capture processor 440 may control power supplied to the microphone array 320. As such, responsive to the activation event, power is supplied to the microphone array 320 to capture audio. In another embodiment, the switch controls flow through of audio captured by the microphone array 320.

The audio capture processor 440 performs pre-processing of the captured audio. Pre-processing techniques include compiling the audio signals from the various microphones in the microphone array 320, noise reduction, echo removal, beamforming, DOA estimation, voice activity detection, equalization, etc. The audio capture processor 440 provides the audio data to an audio buffer 332. The audio buffer 332 stores audio data captured over the most recent time period (e.g., in the most recent 10 seconds). The audio buffer 332 may be implemented a component of the audio system 300, as described above in FIG. 3.

The activity detector 460 analyzes the audio data stored in the audio buffer 332 to validate the activation event. The activity detector 460 performs the analysis according to principles described above in FIG. 3 for the activation validation module 390. For example, a vocal intensity may be compared against an intensity threshold to determine whether the user is within an interaction range with the headset. If the user is within the interaction range, the validation results in a valid activation state. If the user is outside the interaction range, the validation results in an invalid activation state. Other approaches for validation are described above in FIG. 3. Based on a result of the validation, an action is performed. Responsive to a valid activation state, a switch between the audio buffer 332 and positive action 490 is closed. The positive action 490 may be any capable function of the headset. The positive action 490 may include use of the audio data stored in the audio buffer 332, e.g., transmitting the audio data to another device and/or performing speech recognition to determine the positive action 490. Responsive to an invalid activate state, the headset performs a return action, e.g., reverting to a low-power state.

Figure 4B:
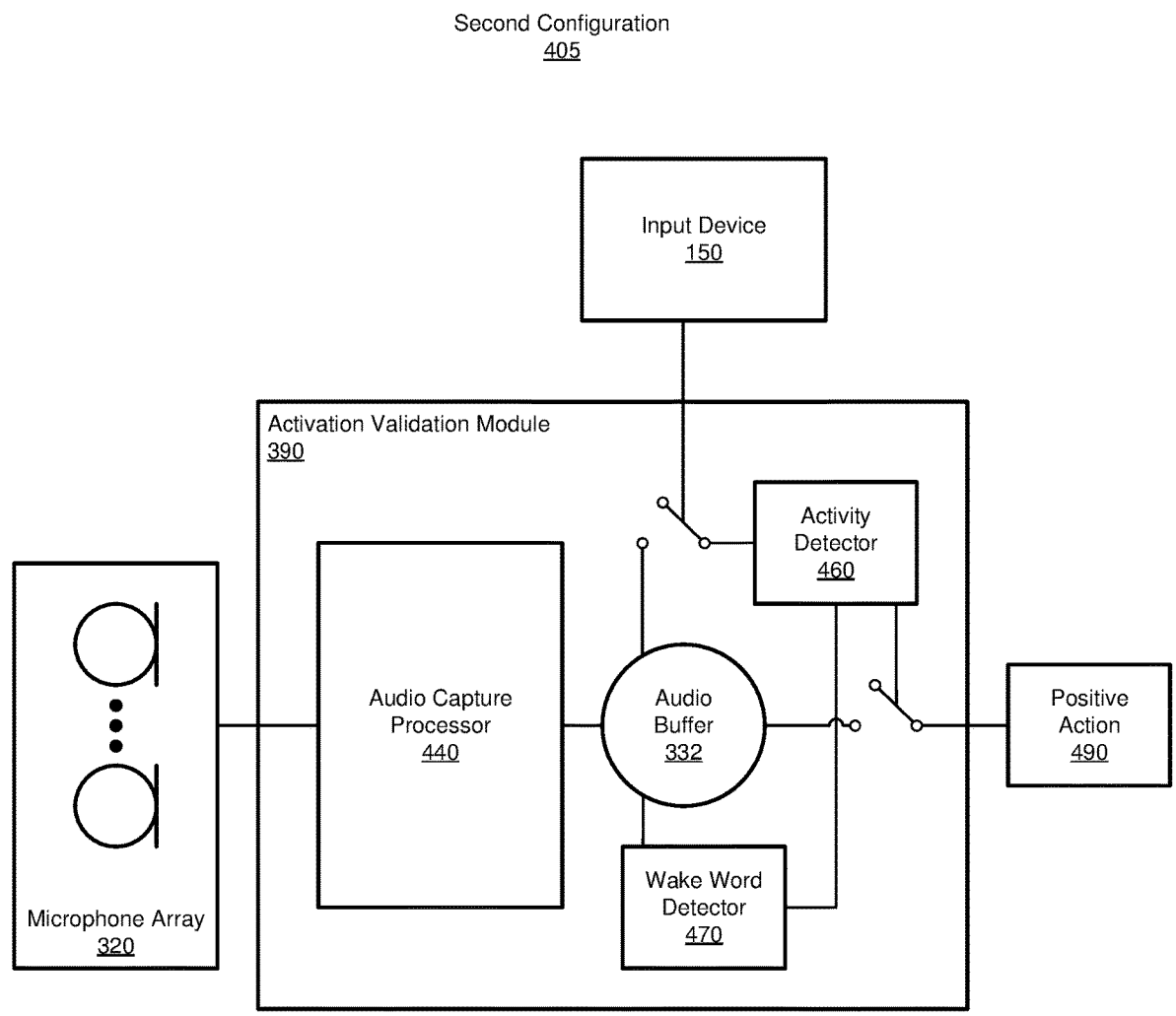
FIG. 4B is a second configuration of the activation validation module, in accordance with one or more embodiments.

FIG. 4B is a second configuration 405 of the activation validation module 390, in accordance with one or more embodiments. The second configuration 405 may also implement the audio system 300 as part of a headset that comprises at least the input device 150. Other embodiments implement the audio system 300 on another type of device, e.g., a console, a remote control, etc. The second configuration further comprises many of the same components as the first configuration 400, with the addition of a wake word detector 470.

According to the second configuration 405, the headset may detect an activation event from one or both of an input to the input device 150 and a wake word detected by the microphone array 320. In this configuration, the microphone array 320 may employ always on recording. Sounds captured by the microphone array 320 are provided to the audio capture processor 440. The audio capture processor 440, as described above, performs pre-processing techniques to generate the audio data and stores the audio data in the audio buffer 332.

According to a first pathway, audio data is provided from the audio buffer 332 to the wake word detector 470. Detection of the wake word triggers an activation event to be validated. The audio data is directed to the activity detector 460 which performs a validation based on analyzing the audio data. One example of analyzing the audio data includes monitoring changes in an acoustic receptive field of the microphone array 320. Other approaches are described above in conjunction with FIG. 3. Based on the validation result, an action is performed. Responsive to a valid activation state, a second switch between the audio buffer 332 and the positive action 490 is closed, thereby causing the headset (or another device) to perform the positive action 490, e.g., streaming the audio data to a secondary device. In a variation of the second configuration 405, detection of the wake word may directly proceed to the positive action 490. Responsive to an invalid activation state, a return action is performed.

According to a second pathway, if the headset detects the activation event from the input device 150, a switch between the audio buffer 332 and the activity detector 460 closes, such that the activity detector 460 can validate the activation event by analyzing the audio data in the audio buffer 332. Based on the result of the validation, an action is performed. A valid activation state resulting from the validation by the activity detector 460 closes a switch between the audio buffer 332 and the positive action 490. Responsive to an invalid activation state, a return action is performed. In some embodiments, both pathways may be implemented in conjunction.

Figure 5:
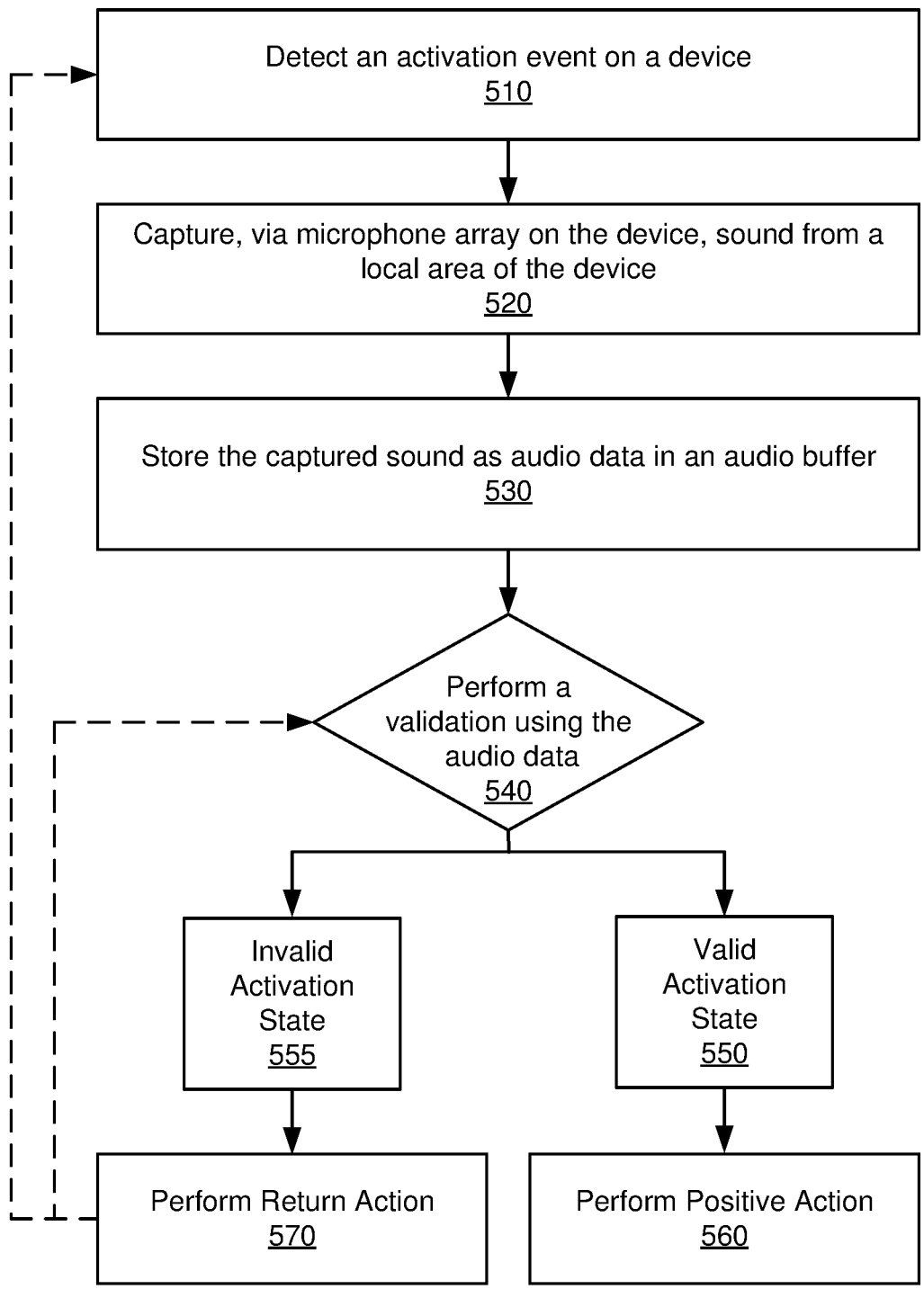
FIG. 5 is a flowchart illustrating a method for validating an activation event, in accordance with one or more embodiments.

FIG. 5 is a flowchart illustrating a method 500 for validating an activation event, in accordance with one or more embodiments. The process shown in FIG. 5 may generally be performed by a device comprising at least an audio system (e.g., audio system 300) input device 150. Other entities may perform some or all of the steps in FIG. 5 in other embodiments. Embodiments may include different and/or additional steps, or perform the steps in different orders.

The device detects 510 an activation event on the device. The activation event may be an input received by the input device, e.g., a touch input via a soft-touch button or a wake word detected from audio data captured by a microphone array. The activation event may also be a voice input from a user speaking a wake word for activating the device. In some embodiments (e.g., that do not use the wake word for activation), responsive to the activation event, the device supplies power to a microphone array of the device.

The device captures 520, via the microphone array, sound from a local area of the device. The microphone array may be an embodiment of the microphone array 320 of the audio system 300 in FIG. 3. The microphone array may comprise one or more microphones located at various positions on the device.

The device stores 530 the captured sound as audio data in an audio buffer. The device may perform some pre-processing on the captured sound to generate the audio data, e.g., as described for the audio capture processor 440 in FIG. 4. The audio buffer may be an embodiment of the audio buffers described elsewhere in this present disclosure.

The device performs 540 a validation using the audio data stored in the audio buffer. The device performs the validation yielding a result of a valid activation state 550 or an invalid activation state 555. The device may analyze the audio data according to any of the principles described above in FIGS. 3, 4A, and 4B, for performing the validation. In one embodiment, a proximity of a user to the device is used to perform the validation. The proximity of the user is determined by evaluating an intensity of the user's speech as captured in the audio data. In another embodiment, a movement of the user relative to the device is used to perform the validation. The movement of the user may be determined using changes in the intensity of the user's speech and/or one or more changes in the acoustic receptive fields of the microphones of the microphone array.

Responsive to the invalid activation state 555, the device performs 570 a return action. One return action involves returning the device to a state of detecting activation events. According to the embodiment wherein power is supplied to the microphone array responsive to detecting the activation event, the device may stop supplying power to the microphone array responsive to the invalid activation state 555. In another example return action, the device may perform iterative validations with newly captured audio data, e.g., stored in the audio buffer. Responsive to iterative determinations of an invalid activation state (e.g., after 30 seconds of failed validations every 5 seconds), the device may return to detecting activation events, e.g., in a low-power mode.

Responsive to the valid activation state 550, the device performs 560 an action. Actions may include, but are not limited to, powering up the device to an active state from a sleep state (or low-power state), transmitting audio data to another device, performing speech-to-text recognition on the audio data to determine a command, performing another capable function of the device, etc.

Activation validation by analyzing audio data helps to avoid expending resources relating to false positive action events. In one or more embodiments, the device may return to a low-power mode responsive to an invalid activation state, thereby saving power and computing resources that would've been expended absent the activation validation. In other embodiments, the device may refrain from performing a positive action (e.g., streaming content to and/or from the device) that would've expended power and resources unnecessarily.

Artificial Reality Environment

Figure 6:
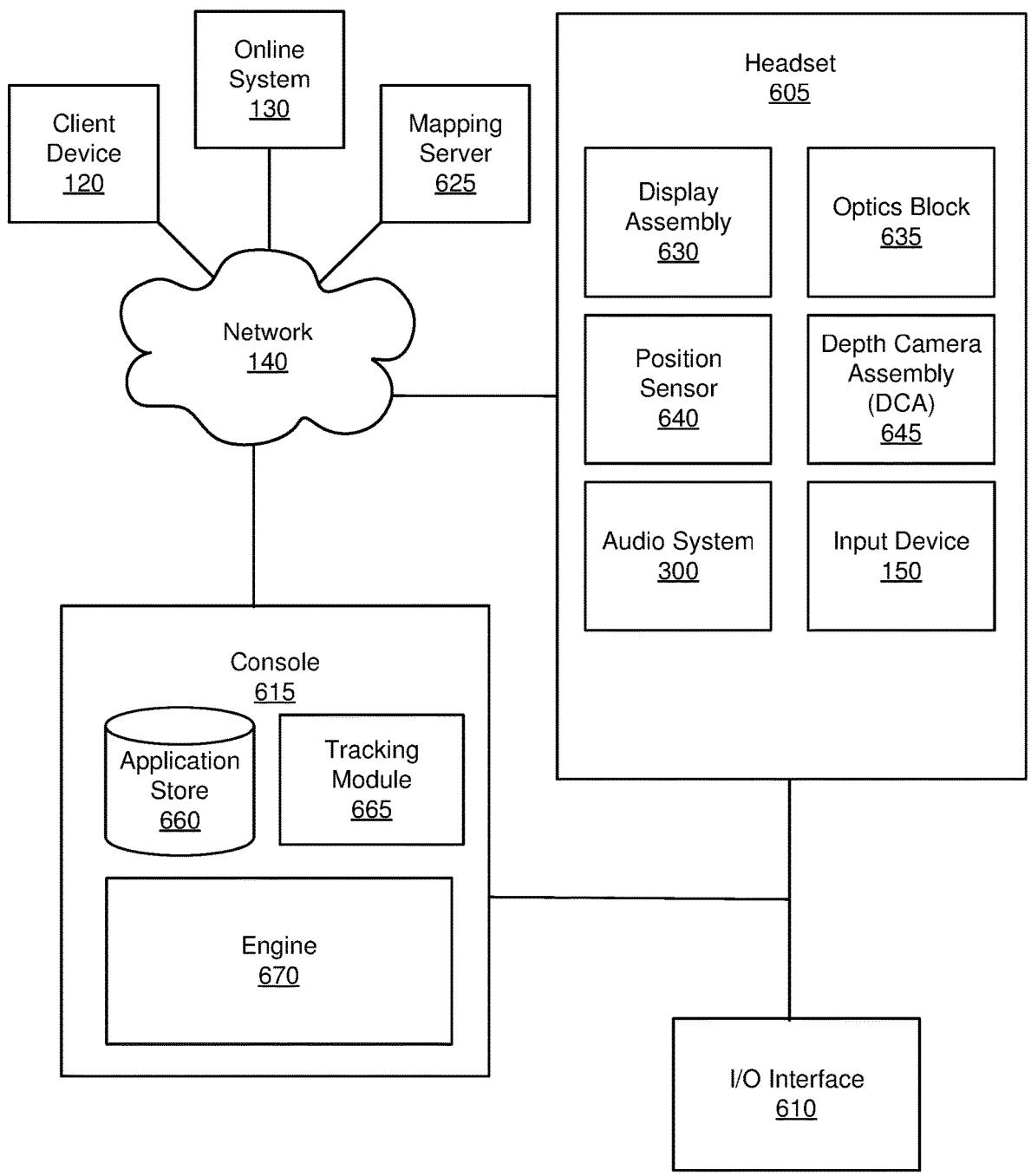
FIG. 6 is an artificial reality system including a headset that validates activation events based on analyzing audio data, in accordance with one or more embodiments.

FIG. 6 is a system 600 that includes a headset 605, in accordance with one or more embodiments. In some embodiments, the headset 605 may be the headset 100 of FIG. 1, the headset 200 of FIG. 2A, or the headset 205 of FIG. 2B. The system 600 operates in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the client device 120, the online system 130, the mapping server 625, and the network 140. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes a display assembly 630, an optics block 635, one or more position sensors 640, a DCA 645, the audio system 300, and the input device 150. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 displays the content using one or more display elements (e.g., the display elements 220). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 220 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 210 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 280 is an embodiment of the position sensor 640. Examples of a position sensor 640 include: one or more IMUS, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for a portion of the local area. The DCA includes one or more imaging devices and a DCA controller. The DCA 645 may also include an illuminator. Operation and structure of the DCA 645 is described above with regard to FIG. 2A.

The audio system 300 provides audio content to a user of the headset 605. The audio system 300 may comprise one or microphones, one or more transducers, and an audio controller. The audio system 300 may provide spatialized audio content to the user. The audio system 300 may further be used to validate activation events of the headset 605, as described throughout this disclosure. In some embodiments, the audio system 300 may request acoustic parameters from the mapping server 625 over the network 140. The acoustic parameters describe one or more acoustic properties (e.g., room impulse response, a reverberation time, a reverberation level, etc.) of the local area. The audio system 300 may provide information describing at least a portion of the local area from e.g., the DCA 645 and/or location information for the headset 605 from the position sensor 640. The audio system 300 may generate one or more sound filters using one or more of the acoustic parameters received from the mapping server 625, and use the sound filters to provide audio content to the user.

The input device 150 is configured to detect input from a user. Input detected by the input device 150 may be used to control operations of the headset 605 and/or other components of the system 600. Example input devices include a depressible button, a soft-touch button, a switch, a dial, a slider, a joystick, etc. According to one or more embodiments, an input detected by the input device 150 may trigger an activation event (e.g., when the headset 605 and/or the system 600 is in a sleep state or a low-power state) to turn on operation of the headset 605 (and/or more generally the system 600). Inputs received by the input device 150 may correspond to performable functions of the headset 605.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 140 couples to the headset 605, the console 615, the client device 120, the online system 130, the mapping server 625, or any combination thereof. The network 140 may include any combination of local area and/or wide area networks using both wireless and/or wired communication systems. For example, the network 140 may include the Internet, as well as mobile telephone networks. In one embodiment, the network 140 uses standard communications technologies and/or protocols. Hence, the network 140 may include links using technologies such as Ethernet, 802.11, worldwide interoperability for microwave access (WiMAX), 3G/3G/4G mobile communications protocols, digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 140 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc.

The mapping server 625 may include a database that stores a virtual model describing a plurality of spaces, wherein one location in the virtual model corresponds to a current configuration of a local area of the headset 605. The mapping server 625 receives, from the headset 605 via the network 140, information describing at least a portion of the local area and/or location information for the local area. The user may adjust privacy settings to allow or prevent the headset 605 from transmitting information to the mapping server 625. The mapping server 625 determines, based on the received information and/or location information, a location in the virtual model that is associated with the local area of the headset 605. The mapping server 625 determines (e.g., retrieves) one or more acoustic parameters associated with the local area, based in part on the determined location in the virtual model and any acoustic parameters associated with the determined location. The mapping server 625 may transmit the location of the local area and any values of acoustic parameters associated with the local area to the headset 605.

One or more components of system 600 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   detecting an activation event on a device;
   responsive to detecting the activation event:

starting supply of a power to a microphone array on the device;
capturing, via the microphone array on the device over a plurality of time periods, sound from a local area of the device;
storing each portion of the sound captured during a respective time period of the plurality of time period as respective audio data in a buffer;
performing a respective validation of a plurality of iterative validations of the activation event by analyzing the respective audio data stored in the buffer; and
performing an action based on a result of the plurality of iterative validations, the action comprises stopping supply of the power to the microphone array when a result of each validation of the plurality of iterative validations is an invalid activation state.

2. The method of claim 1, wherein the activation event is a press of a soft-touch button on the device.

3. The method of claim 1, wherein the action further comprises switching the device into a high-power state from a low-power state when the result of the plurality of iterative validations is a valid activation state.

4. The method of claim 3, further comprising:
transmitting the respective audio data stored in the buffer to a second device when the result of the plurality of iterative validations is the valid activation state.

5. The method of claim 1, further comprising:
responsive to detecting the activation event on the device, switching the device into a high-power state from a low-power state, wherein a first power is supplied to the microphone array in the low-power state, a second power is supplied to the microphone array in the high-power state, and the first power is lower than the second power.

6. The method of claim 1, wherein performing the plurality of iterative validations of the activation event by analyzing the captured sound comprises:
determining a proximity of the device to a user of the device based on the captured sound; and
determining the result of the plurality of iterative validations based in part on the determined proximity.

7. The method of claim 6, wherein determining the proximity of the device to the user comprises:
identifying a portion of the captured sound as speech generated by the user; and
analyzing an intensity of the speech to estimate the proximity of the device to the user.

8. The method of claim 1, wherein performing the plurality of iterative validations of the activation event by analyzing the captured sound comprises:
determining a movement of the device relative to a user of the device based on the captured sound; and
determining the result of the plurality of iterative validations based in part on the determined movement.

9. The method of claim 8, wherein the result of the plurality of iterative validations is determined to be the invalid activation state based on the determined movement of the device being away from the user of the device.

10. The method of claim 8, wherein determining the movement of the device relative to the user comprises:
identifying a portion of the captured sound as speech generated by the user; and
analyzing an intensity of the speech over time to determine the movement of the device relative to the user.

11. The method of claim 8, wherein determining the movement of the device relative to the user comprises:
determining an acoustic receptive field of the microphone array using the captured sound; and
analyzing the acoustic receptive field over time to determine the movement of the device relative to the user.

12. The method of claim 11, wherein the microphone array includes a first microphone configured to monitor a first region in the acoustic receptive field, wherein the first region is a null region when the device is in a first position relative to the user, and analyzing the acoustic receptive field over time comprises determining whether the first region transitions between an active region and the null region over time.

13. A headset comprising:
a frame configured to be worn on a head of a user;
a soft-touch button on the frame and configured to detect an activation event;
a microphone array configured to capture sound; and
a controller configured to:
start supply of a power to the microphone array responsive to detection of the activation event,
instruct the microphone array to capture sound from a local area of the headset over a plurality of time periods responsive to detection of the activation event,
store each portion of the sound captured during a respective time period of the plurality of time period as respective audio data in a buffer,
perform a respective validation of a plurality of iterative validations of the activation event by analyzing the respective audio data stored in the buffer, and
perform an action based on a result of the plurality of iterative validations, the action comprises stopping supply of the power to the microphone array when the result of each validation of the plurality of iterative validations is an invalid activation state.

14. The headset of claim 13, wherein the soft-touch button is a capacitive touch sensor configured to determine the activation event based on a proximity of skin of the user to the capacitive touch sensor.

15. The headset of claim 13, wherein the controller is further configured to:
switch the headset into a high-power state from a low-power state when the result of the plurality of iterative validations is a valid activation state.

16. The headset of claim 13, wherein the controller is further configured to:
switch the headset into a high-power state from a low-power state based on the activation event, wherein a first power is supplied to the microphone array in the low-power state, a second power is supplied to the microphone array in the high-power state, and the first power is lower than the second power.

17. A non-transitory computer-readable storage medium storing instructions that, when executed by a processor, cause the processor to perform operations comprising:
detecting an activation event on a device;
responsive to detecting the activation event:
starting supply of a power to a microphone array on the device;
instructing the microphone array to capture sound from a local area of the device over a plurality of time periods;
storing each portion of the sound captured during a respective time period of the plurality of time period as respective audio data in a buffer;

performing a respective validation of a plurality of iterative validations of the activation event by analyzing the respective audio data stored in the buffer; and performing an action based on a result of the plurality of iterative validations, the action comprises stopping supply of the power to the microphone array when a result of each validation of the plurality of iterative validations is an invalid activation state.

\* \* \* \* \*